(12) United States Patent
Filsfils et al.

(10) Patent No.: US 11,445,048 B2
(45) Date of Patent: Sep. 13, 2022

(54) SYSTEMS AND METHODS FOR COMPRESSING A SID LIST

(71) Applicant: Cisco Technology, Inc., San Jose, CA (US)

(72) Inventors: Clarence Filsfils, Brussels (BE); Francois Clad, Strasbourg (FR); Pablo Camarillo Garvia, Madrid (ES); Siva Sivabalan, Kanata (CA); Syed Kamran Raza, Kanata (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/990,030

(22) Filed: Aug. 11, 2020

(65) Prior Publication Data
US 2022/0053072 A1   Feb. 17, 2022

(51) Int. Cl.
*H04L 69/04* (2022.01)
*H04L 45/74* (2022.01)

(52) U.S. Cl.
CPC .............. *H04L 69/04* (2013.01); *H04L 45/74* (2013.01)

(58) Field of Classification Search
None
See application file for complete search history.

(56) References Cited

U.S. PATENT DOCUMENTS

| 10,419,333 | B2 | 9/2019 | Lin et al. |
| 2020/0099775 | A1 | 3/2020 | Brissette et al. |
| 2020/0358698 | A1* | 11/2020 | Song .................. H04L 45/34 |
| 2020/0366763 | A1* | 11/2020 | Bonica ................ H04L 45/741 |
| 2021/0067441 | A1* | 3/2021 | Hari .................... H04L 49/25 |

FOREIGN PATENT DOCUMENTS

CN   110557337 A   12/2019

OTHER PUBLICATIONS

Li, Z., et al., "Compressed SRv6 Network Programming," Jul. 22, 2019, 14 pages.
Cheng, W. et al. "Generalized SRv6 Network Programming," Mar. 9, 2020, 31 pages.
Li, Z., et al., "Compressed SRv6 Network Programming," Jan. 23, 2020, 24 pages.
Yao, et al., "SRv6 Compressed Path Recover Method," Jun. 28, 2020, 10 pages.
Filsfils, C., "Network Programming Extension: SRv6 uSID Instruction," Feb. 25, 2020, 14 pages.
Patent Cooperation Treaty, International Search Report and Written Opinion, International Application No. PCT/US2021/044282, dated Nov. 30, 2021, 14 pages.

* cited by examiner

*Primary Examiner* — Lonnie V Sweet
(74) *Attorney, Agent, or Firm* — Baker Botts, LLP

(57) ABSTRACT

In one embodiment, a method includes identifying, by a network component, a first segment identifier (SID) within a SID list. The first SID includes a first SID block and a first micro SID (uSID). The method also includes initializing, by the network component, a packing list of a uSID carrier with the first uSID of the first SID and initializing, by the network component, a packing block of the uSID carrier with the first SID block of the first SID. The method further includes initializing, by the network component, a remaining packing capacity of the packing list with a carrier capacity of the first SID and initializing, by the network component, an empty compressed SID list.

20 Claims, 8 Drawing Sheets

SYSTEMS AND METHODS FOR COMPRESSING A SID LIST

TECHNICAL FIELD

The present disclosure relates generally to segment identifiers (SIDs), and more specifically to systems and methods for compressing a SID list.

BACKGROUND

Segment Routing (SR) is a form of computer networking that allows a headend node to steer a packet flow along any path within a network. In SR, the headend node steers the packet flow into an SR Policy. The SR Policy may be instantiated on a headend node with a SID list. The headend node may be specified as an Internet Protocol address (e.g., an Internet Protocol version 6 (IPv6) address). If the SID list includes multiple SR SIDs (e.g., multiple SR over IPv6 (SRv6) SIDs), multiple headers (e.g., an IPv6 header and Segment Routing Header (SRH)) may be required to encode the SID list onto a packet.

DESCRIPTION OF EXAMPLE EMBODIMENTS

Overview

Figure 1:
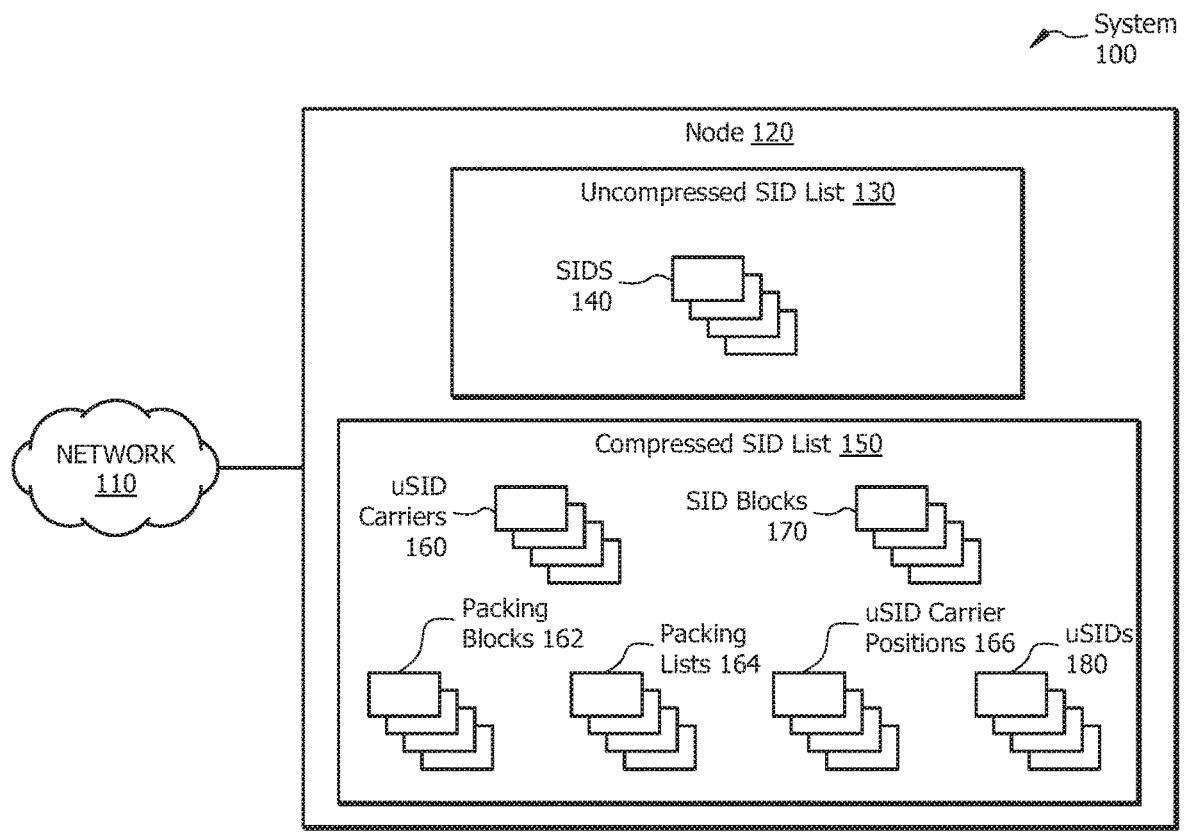
FIG. 1 illustrates an example system for compressing a SID list.

According to an embodiment, a network component includes one or more processors and one or more computer-readable non-transitory storage media coupled to the one or more processors. The one or more computer-readable non-transitory storage media include instructions that, when executed by the one or more processors, cause the network component to perform operations including identifying a first SID within a SID list. The first SID includes a first SID block and a first uSID. The operations also include initializing a packing list of a uSID carrier with the first uSID of the first SID and initializing a packing block of the uSID carrier with the first SID block of the first SID. The operations further include initializing a remaining packing capacity of the packing list with a carrier capacity of the first SID and initializing an empty compressed SID list.

In certain embodiments, the operations include identifying a second SID within the SID list, where the second SID includes a second SID block and a second uSID. The operations further include determining that the second SID block is the same as the packing block of the uSID carrier, appending the second uSID of the second SID to the packing list of the uSID carrier, and decrementing the remaining packing capacity of the packing list by a carrier usage of the second SID.

In some embodiments, the operations include identifying a second SID within the SID list, where the second SID includes a second SID block and a second uSID. The operations further include determining that the second SID block is different from the packing block of the uSID carrier, generating the uSID carrier using the packing block and the packing list, appending the uSID carrier to the compressed SID list, replacing the first uSID of the packing list with the second uSID, replacing the first SID block of the packing block with the second SID block, and setting a remaining packing capacity of the packing list with a carrier capacity of the second SID.

In some embodiments, the operations include identifying a second SID within the SID list, where the second SID includes a second SID block and a second uSID. The operations further include determining that the second SID block is the same as the packing block of the uSID carrier, determining that a uSID carrier usage of the second SID is greater than the remaining packing capacity of the packing list, generating the uSID carrier using the packing block and the packing list, appending the uSID carrier to the compressed SID list, replacing the first uSID of the packing list with the second uSID, and replacing the remaining packing capacity of the packing list with a carrier capacity of the second SID.

In certain embodiments, the operations include identifying a second SID within the SID list, where the second SID is instantiated on a particular parent node. The operations also include identifying a third SID within the SID list, where the third SID is subsequent to the second SID within the SID list and the third SID is instantiated on the particular parent node. The operations further include packing the second SID and the third SID within a second uSID carrier.

In some embodiments, the operations include encoding the compressed SID list in a network packet using an Internet Protocol version 6 (IPv6) header. The compressed SID list may be included within a single 128-bit Segment Routing over IPv6 (SRv6) SID. In certain embodiments, the remaining packing capacity depends on a SID structure and packet editing capabilities of the network component. In some embodiments, a topological and service path of a network packet steered onto the compressed SID list is the same as the topological and service path of the network packet steered onto the uncompressed SID list.

According to another embodiment, a method includes identifying, by a network component, a first SID within a SID list. The first SID includes a first SID block and a first uSID. The method also includes initializing, by the network component, a packing list of a uSID carrier with the first uSID of the first SID and initializing, by the network component, a packing block of the uSID carrier with the first SID block of the first SID. The method further includes initializing, by the network component, a remaining packing capacity of the packing list with a carrier capacity of the first SID and initializing, by the network component, an empty compressed SID list.

According to yet another embodiment, one or more computer-readable non-transitory storage media embody instructions that, when executed by a processor, cause the processor to perform operations including identifying a first SID within a SID list. The first SID includes a first SID block and a first uSID. The operations also include initializing a packing list of a uSID carrier with the first uSID of the first SID and initializing a packing block of the uSID carrier with the first SID block of the first SID. The operations further include initializing a remaining packing capacity of the packing list with a carrier capacity of the first SID and initializing an empty compressed SID list.

Technical advantages of certain embodiments of this disclosure may include one or more of the following. This disclosure describes systems and methods for compressing a SID list by encoding several uSIDs in the format of a single IPv6 address, known as a uSID carrier. The SID compression techniques described herein are fully compliant with SRH and network programming concepts. The SID compression techniques extend the SRv6 network programming framework with new SRv6 endpoint behaviors. SRv6 SIDs associated with these new uSID behaviors can be seamlessly combined with any other SID in an SRv6 Policy SID list. When a SID list includes several consecutive uSIDs, the consecutive uSIDs may be compressed (i.e. packed) in a smaller number of uSID carriers, which reduces the number of bytes encoded in the packet header. The topological and service path followed by a network packet steered onto the compressed SID list is exactly the same as the path of the network packet steered onto the original uncompressed SID list.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Figure 2:
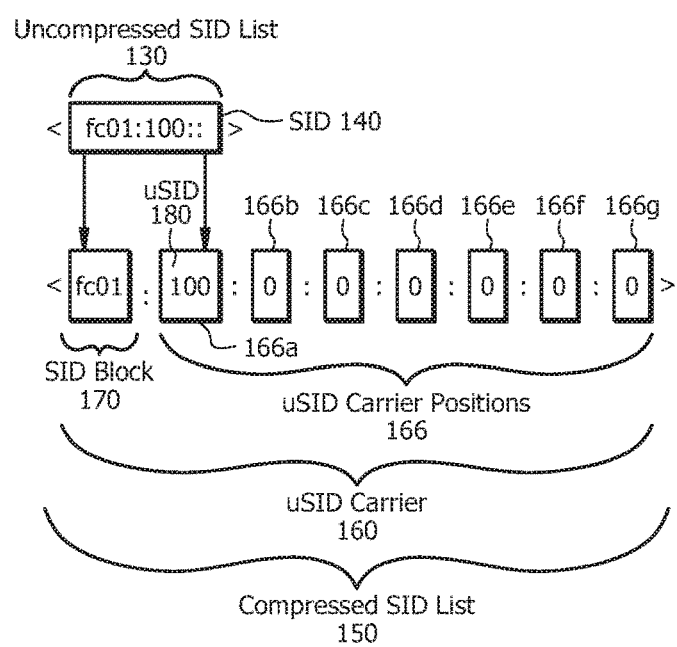
FIG. 2 illustrates an example single-SID compressed SID list that may be used by the system of FIG. 1.
Figure 3:
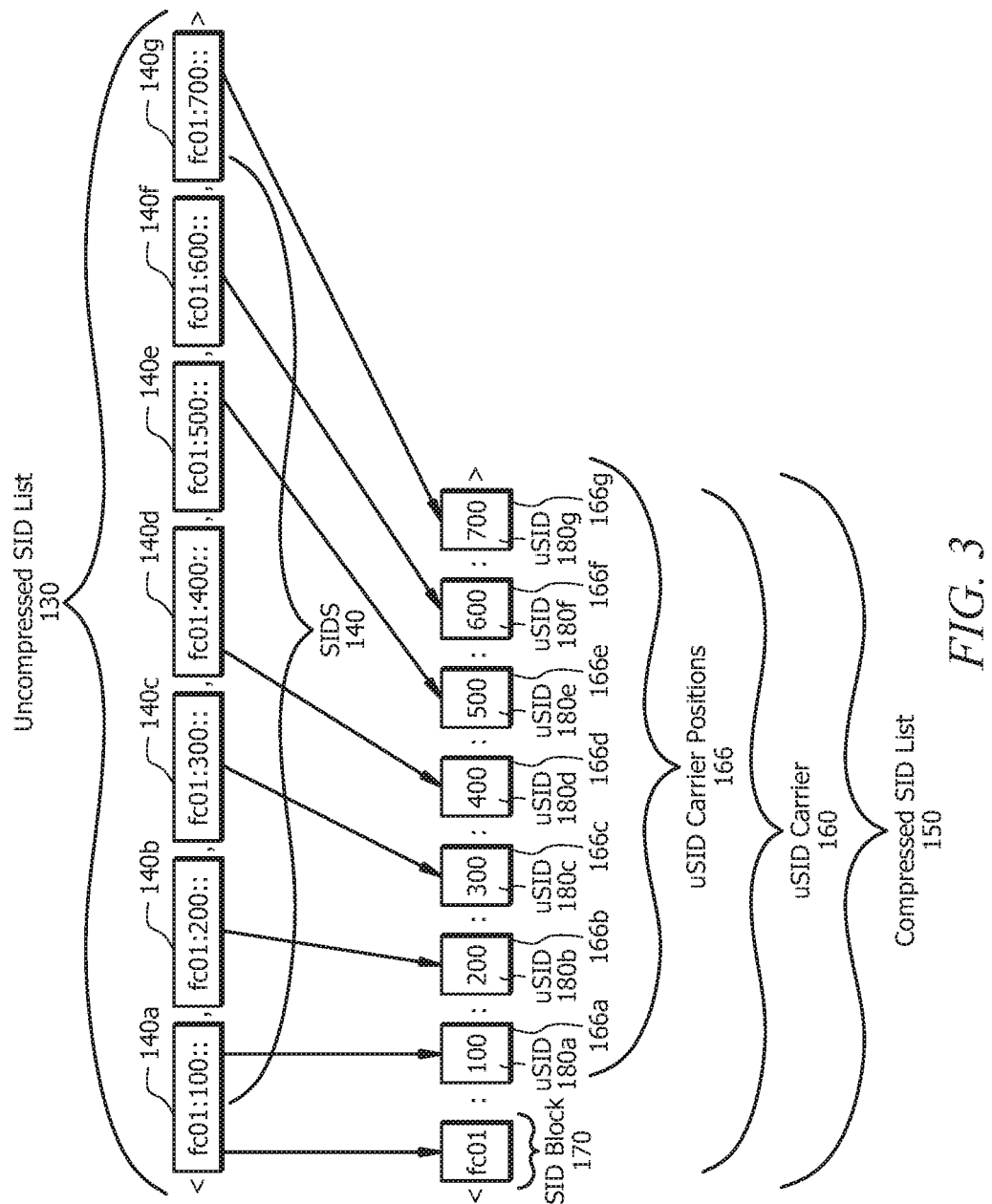
FIG. 3 illustrates an example full-carrier compressed SID list that may be used by the system of FIG. 1.
Figure 4:
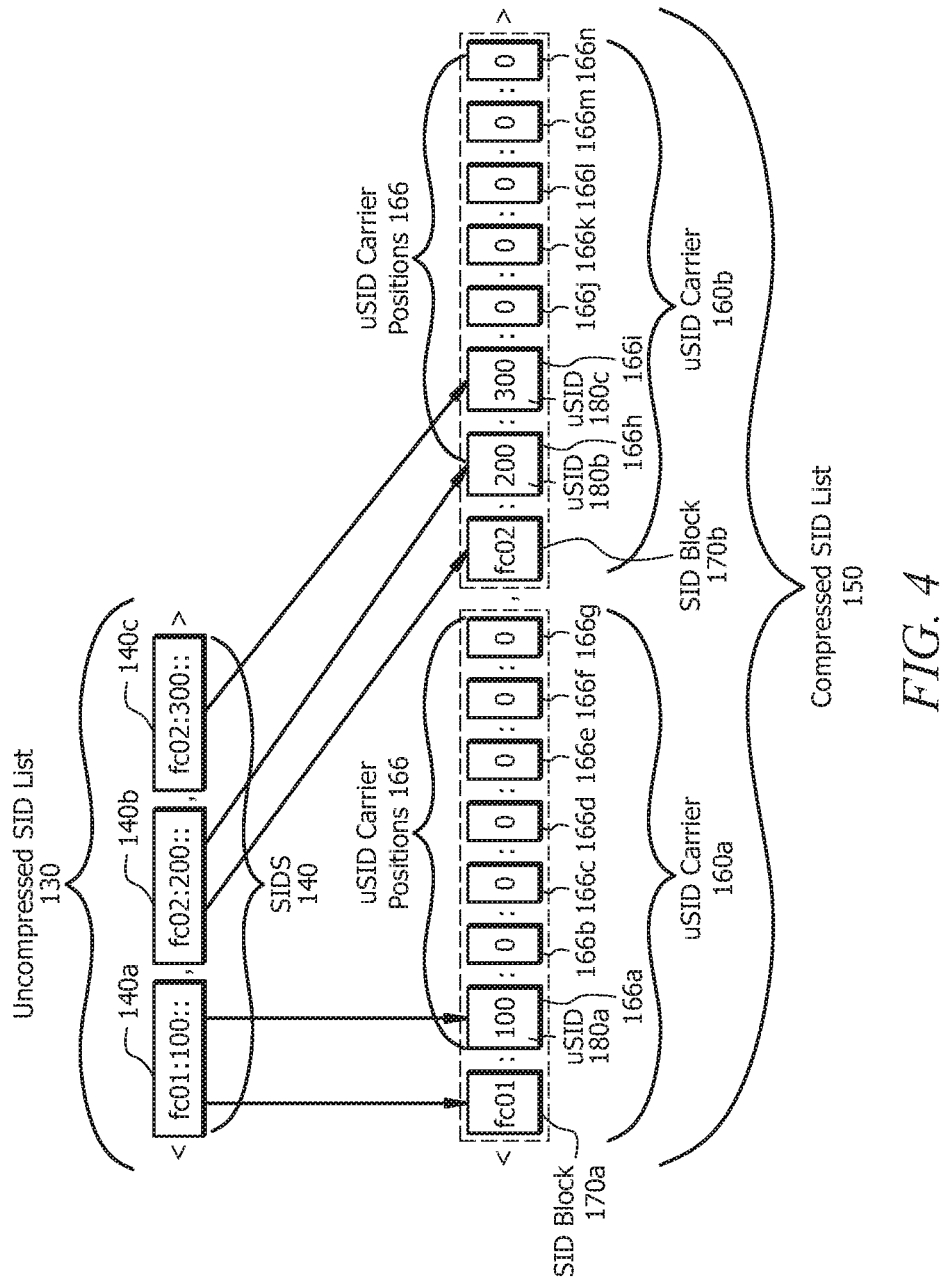
FIG. 4 illustrates an example multiple-carrier compressed SID list that may be used by the system of FIG. 1.
Figure 5:
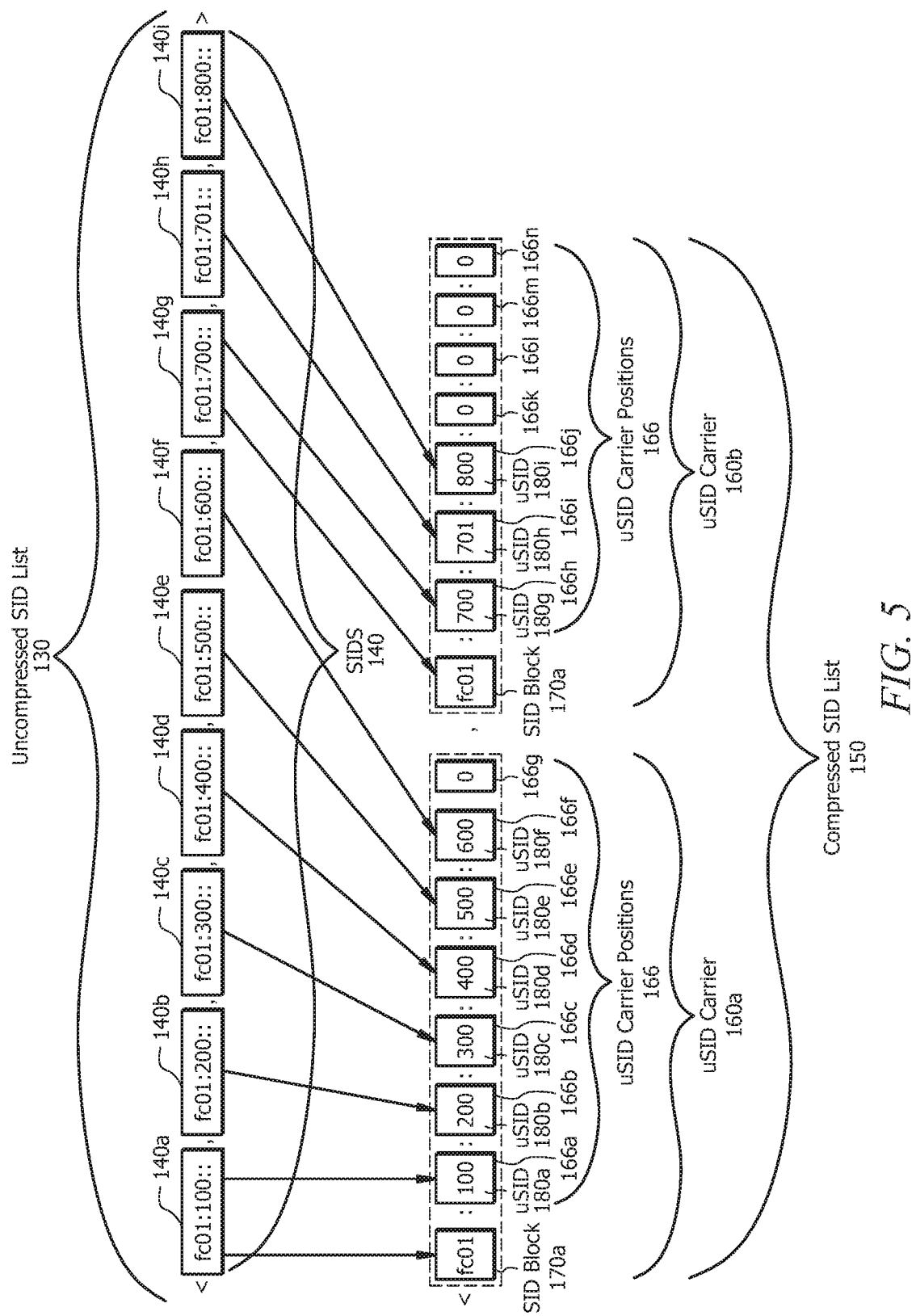
FIG. 5 illustrates another example multiple-carrier compressed SID list that may be used by the system of FIG. 1.
Figure 6:
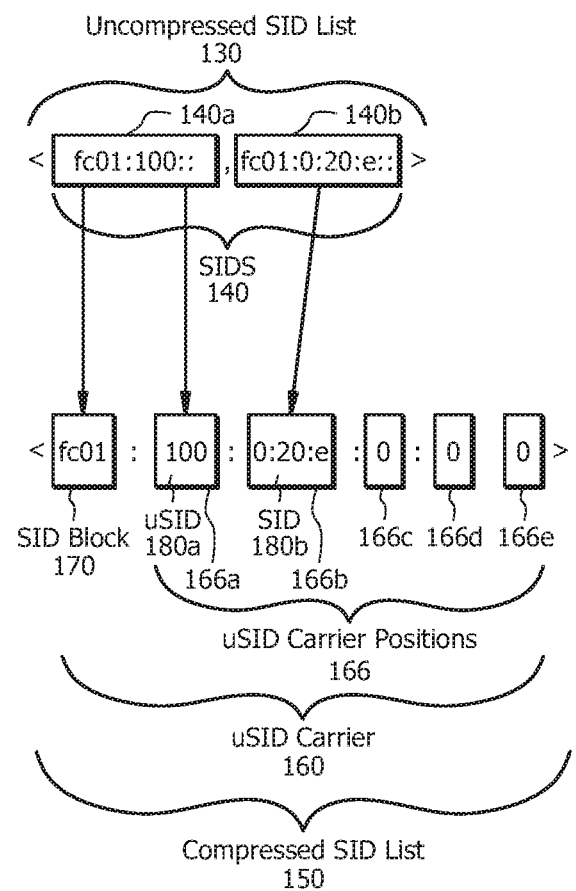
FIG. 6 illustrates an example compressed SID list associated with different endpoint behaviors that may be used by the system of FIG. 1.
Figure 7A:
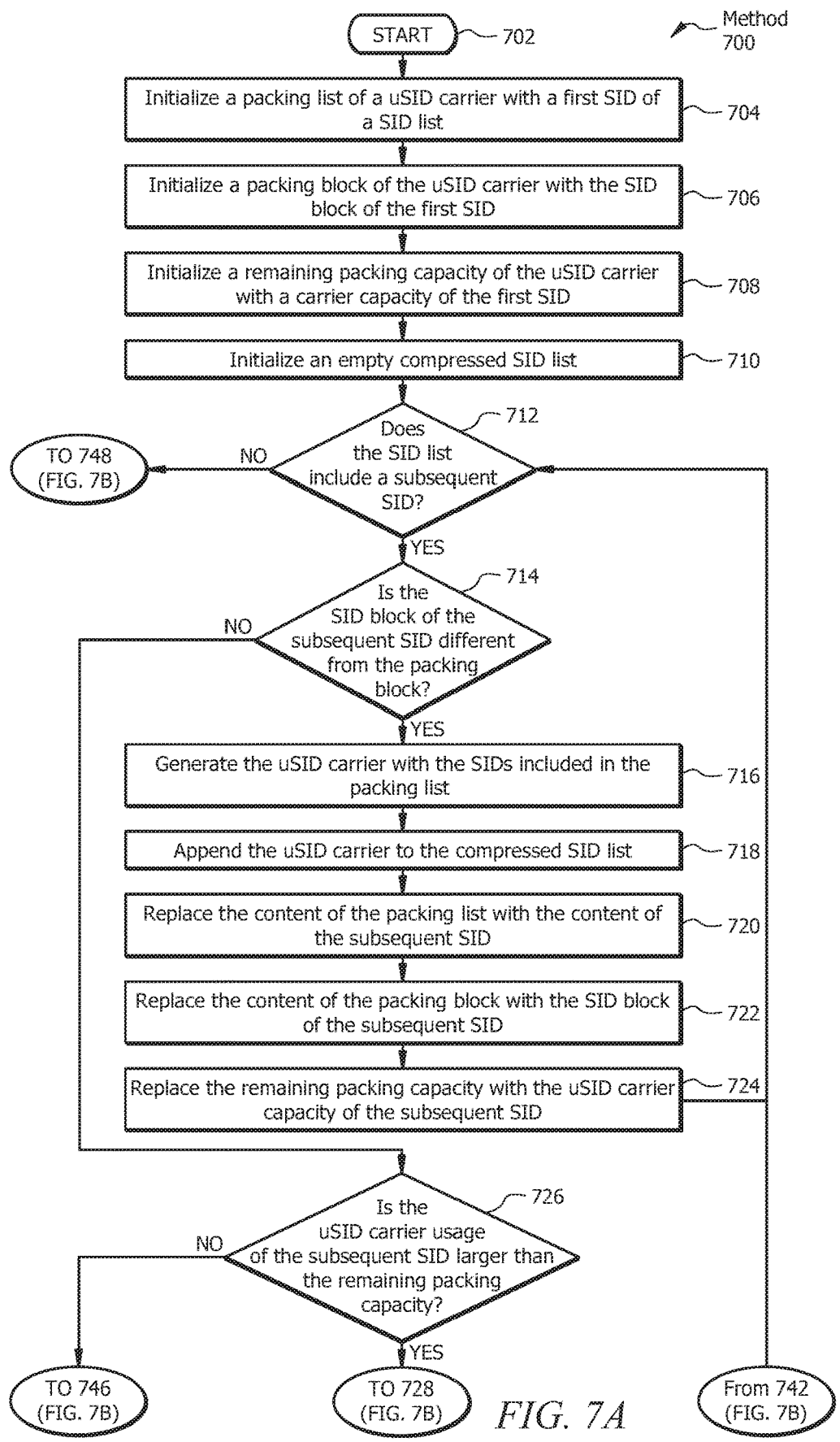
FIGS. 7A and 7B illustrate an example method for compressing a SID list.
Figure 7B:
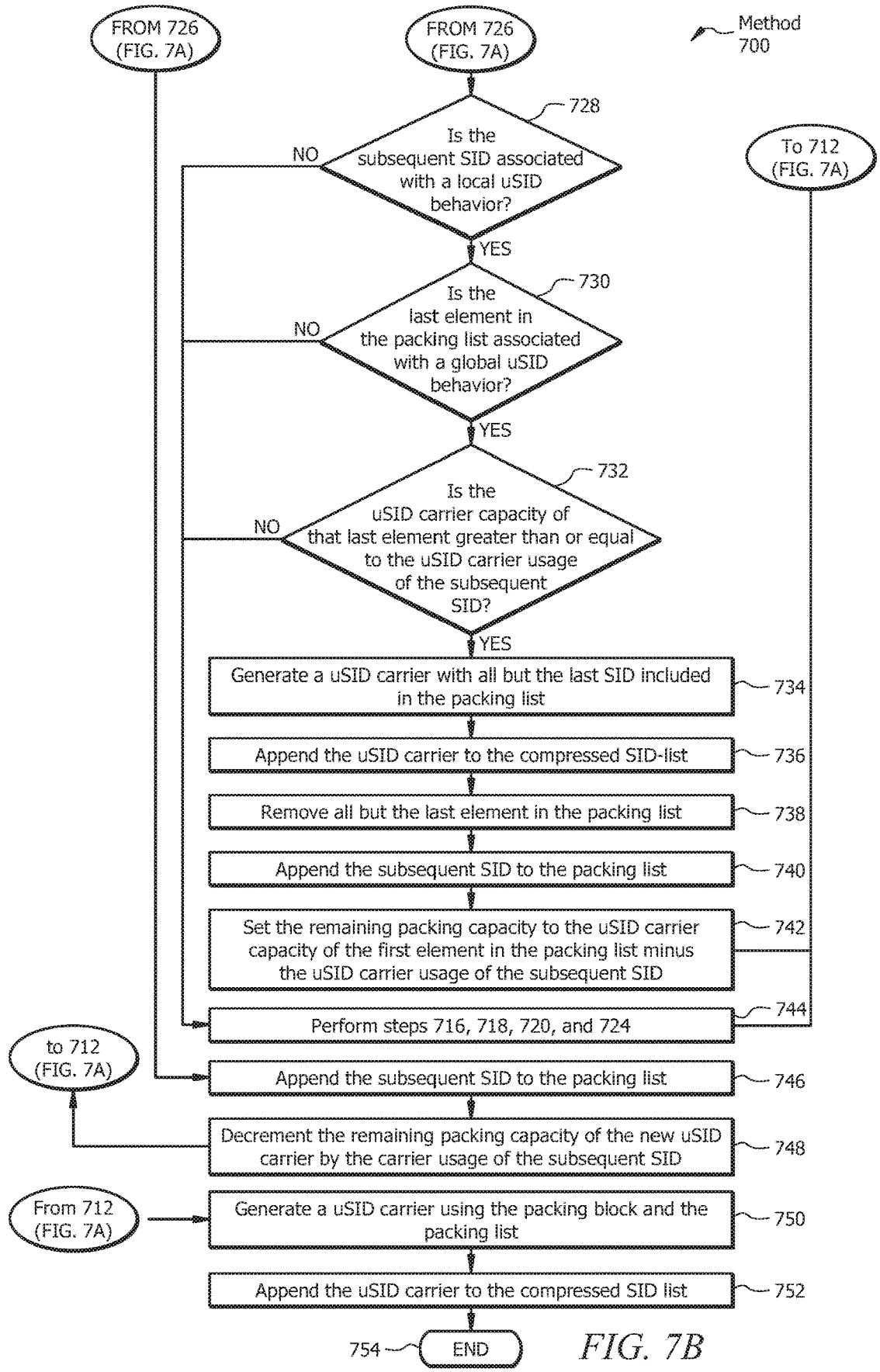
Figure 8:
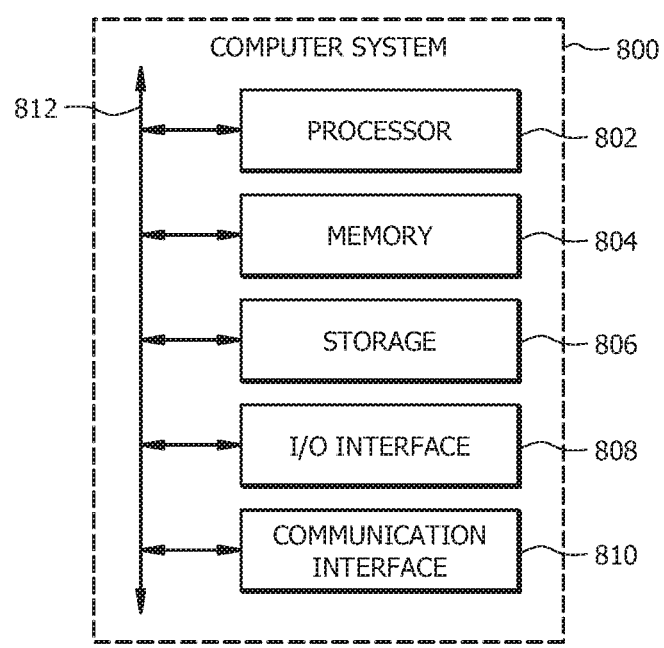
FIG. 8 illustrates an example computer system that may be used by the systems and methods described herein.

This disclosure describes systems and methods for compressing a SID list. FIG. 1 shows an example system for compressing a SID list. FIG. 2 shows an example single-SID compressed SID list that may be used by the system of FIG. 1, and FIG. 3 shows an example full-carrier compressed SID list that may be used by the system of FIG. 1. FIGS. 4 and 5 each show an example multiple-carrier compressed SID list that may be used by the system of FIG. 1. FIG. 6 shows an example compressed SID list associated with different endpoint behaviors that may be used by the system of FIG. 1, and FIGS. 7A and 7B show an example method for compressing a SID list. FIG. 8 shows an example computer system that may be used by the systems and methods described herein.

FIG. 1 illustrates an example system 100 for compressing a SID list. System 100 or portions thereof may be associated with an entity, which may include any entity, such as a business or company that compresses SID lists. The components of system 100 may include any suitable combination of hardware, firmware, and software. For example, the components of system 100 may use one or more elements of the computer system of FIG. 6. System 100 of FIG. 1 includes a network 110, a node 120, an uncompressed SID list 130, SIDS 140, a compressed SID list 150, uSID carriers 160, packing blocks 162, packing lists 164, uSID carrier positions 166, SID blocks 170, and uSIDs 180.

Network 110 of system 100 is any type of network that facilitates communication between components of system 100. Network 110 may connect one or more components of system 100. One or more portions of network 110 may include an ad-hoc network, an intranet, an extranet, a virtual private network (VPN), a local area network (LAN), a wireless LAN (WLAN), a WAN, a wireless WAN (WWAN), a software-defined networking in a WAN (SD-WAN), a metropolitan area network (MAN), a portion of the Internet, a portion of the Public Switched Telephone Network (PSTN), a cellular telephone network, a Digital Subscriber Line (DSL), a 3G network, a 4G network, a 5G network, a Long Term Evolution (LTE) network, a combination of two or more of these, or other suitable types of networks. Network 110 may include one or more different types of networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like. In the illustrated embodiment of FIG. 1, network 110 is a segment routing (SR) network. Network 110 may be associated with one or more Internet Protocols (e.g., IPv4, IPv6, etc.), SRv6, Multiprotocol Label Switching (MPLS), and the like.

Node 120 of system 100 represents any suitable computing component (e.g., a router, a server, a controller, etc.) that can receive, create, process, store, and/or send traffic to other components within network 110. Node 120 may be controlled by an entity (e.g., a network service provider). In certain embodiments, node 120 represents a router or a controller that computes an SR path. In some embodiments, node 120 is a router that receives uncompressed SID list 130 from a third party (e.g., a controller or manual configuration by an operator) and installs uncompressed SID list 130 into the data plane of node 120. Uncompressed SID list 130 of system 100 represents a specific source-routed path to send traffic from a headend node of network 110 to an endpoint node of network 110 of a corresponding SR policy. Uncompressed SID list 130 includes an ordered list of segments. The segments of uncompressed SID list 130 are identified by SIDS 140.

In certain embodiments, SIDS 140 of uncompressed SID list 130 include one or more uSIDs 180. Each uSID 180 is associated with a particular endpoint behavior. Each uSID may be advertised in a routing protocol with an SRv6 endpoint behavior identifier and a SID structure type-length-value TLV (STRUCT TLV). The behavior identifier indicates the pseudo-code that is triggered when a packet with uSID 180 is received by its parent node. In certain embodiments, the STRUCT TLV indicates a length of each constituent element of the SID value (locator_block, locator_node, function and argument). Since SRv6 uSID endpoint behaviors are associated with their own behavior identifiers, node 120 can determine whether a particular SID 140 includes uSID 180 associated with a particular endpoint behavior by looking at the behavior identifier that is advertised with that particular SID 140.

Each uSID 180 may have either global or local significance. A globally significant uSID 180 has the same meaning on all nodes in an SRv6 domain (e.g., forward to a first node of network 110). A locally significant uSID may vary in meaning from one node to another (e.g., the same local uSID 180 may be associated on first node of network 110 to an x-connect operation on interface TenGigabitEthernet0/1/0, on a second node of network 110 to interface TenGigabitEthernet0/2/0, and on a third node of network 110 to a decap-and-lookup operation in a virtual routing and forwarding (VRF) table).

In certain embodiments, node 120 transforms uncompressed SID list 130 into compressed SID list 150. Compressed SID list 150 is formatted such that uSIDs 180 of uncompressed SID list 130 are included within a single header (e.g., an IPv6 header). In some embodiments, compressed SID list 150 is a single IP address (e.g., an IPv6 address) encoded with several uSIDs 180. Compressed SID list 150 includes one or more uSID carriers 160. Each uSID carrier 160 includes one or more uSIDs 180 in the format of a single IP address (e.g., an IPv6 address). Packing block 162 is used to pack SID block 170 of SID 140 into uSID carrier 160. Each SID block 170 is an IP prefix of SID 140. For example, each SID block 170 may be an IPv6 prefix P/p, where p is equal to the "locator_block length" value included within the STRUCT TLV advertised with SID 140 and P is the IP address (e.g., IPv6 address) obtained from the SID value of SID 140 by setting the 128-p least significant bits to 0.

Packing list 164 is used to pack a sequence of uSIDs 180 into uSID carrier 160. Packing list 164 uses uSID carrier positions 166 to pack uSIDs 180 into uSID carriers 160. For example, node 120 may pack uSID 180 of first SID 140 into a first uSID carrier position 166, node 120 may pack uSID 180 of second SID 140 into a second uSID carrier position, and so on. In some embodiments, uSID carrier 160 may be terminated by zero or more end-of-carrier identifier(s). In certain embodiments, each uSID carrier 160 of system is 128 bits. For example, uSID carrier 160a may include a 16-bit uSID block 170 and seven 16-bit uSIDs 180.

In certain embodiments, node 120 may be an external path computation element (PCE) that computes uncompressed SID list 130 (which may comply with certain traffic engineered requirements (e.g., low latency, disjoint paths, resource exclusion, etc.)) and compresses uncompressed SID list 130 to generate compressed SID list 150. Node 120 may then communicate compressed SID list 150 to another node 120 of network 110 (e.g., a headend router).

In some embodiments, node 120 may be a headend router that computes uncompressed SID list 130 (which may comply with certain traffic engineered requirements (e.g., low latency, disjoint paths, resource exclusion, etc.) or a Topology-Independent Loop-Free Alternate (TI-LFA) backup path) and compresses uncompressed SID list 130 to generate compressed SID list 150. In some embodiments, SID list 130 is partially compressed by a PCE and partially compressed by a headend node. For example, the PCE may perform a pre-packing by grouping together sequences of uSIDs 180 having the same parent node into larger SIDs 140. These larger SIDs 140 may still have room for more uSIDs 180. The PCE may then provide this pre-packed SID list 130 to the headend node, which performs the rest of the packing operation. Node 120 may install compressed SID list 150 into the data plane of node 120. In certain embodiments, the original calculation for uncompressed SID list 130 and the compression of compressed SID list 150 may be performed by two independent processes running on node 120 (e.g., Interior Gateway Protocol (IGP) and Routing Information Base (RIB)).

In certain embodiments, node 120 may be a router that is configured (e.g., manual configuration by an operator) with an explicit uncompressed SID list 130. Node 120 may compress uncompressed SID list 130 to generate compressed SID list 150 and install compressed SID list 150 into the data plane of node 120.

Node 120 may compute a uSID carrier capacity of SID 140. In certain embodiments, the uSID carrier capacity of SID 140 is equal to the "argument length" value included within the STRUCT TLV advertised with SID 140. In some embodiments, the uSID carrier capacity of SID 140 is equal to 128 minus the sum of all length values (locator_block length+locator_node length+function length+argument length) included within the STRUCT TLV advertised with SID 140. For example, the uSID carrier capacity of uSID 180 may be equal to 128 bits minus the 16-bit length of SID block 170 and the 16-bit length of uSID 180, which is 96 bits.

Node 120 may compute the uSID carrier usage of uSID 180. In certain embodiments, the uSID carrier usage of uSID 180 is equal to the sum of the "locator_node length" and "function length" values included within the STRUCT TLV advertised with SID 140. In some embodiments, the uSID carrier usage of uSID 180 is equal to the sum of the "locator_node length," "function length," and "argument length" values included within the STRUCT TLV advertised with SID 140. For example, the uSID carrier usage of uSID 180 may be equal to 16 bits.

Compressed SID list 150 of system 100 represents a compressed version of uncompressed SID list 130. Compressed SID list 150 is as short as possible while allowing the topological and service path followed by a packet steered onto compressed SID list 150 to be exactly the same as the path of packet steered onto uncompressed SID list 130. In certain embodiments, compressed SID list 150 complies with the capabilities and limitations of the underlying hardware. Certain hardware platforms are capable of writing a limited number of variable bits into each packet, and this limited number of variable bits is shared among all elements that need to be written. As such, the carrier capacity of each uSID carrier 160 may be limited and therefore should be taken into account during the compression process. The uSID carrier capacity values may be adjusted as appropriate to comply with any hardware limitation (e.g., by taking the minimum of the carrier capacity computed from the SID STRUCT TLV and the hardware write limit).

Generally, a sequence of two or more consecutive SIDS 140 that have the same parent node are packed in the same carrier whenever possible. For example, a local uSID 180 that directly follows a global uSID 180 is packed in the same uSID carrier 160 of uncompressed SID list 150 to leverage the longest-prefix match capabilities of the processing router (single lookup instead of two). In some embodiments, consecutive uSIDs 180 in uncompressed SID list 130 that are instantiated on the same parent node (e.g., share the same SID block 170) are packed in the same uSID carrier 160.

In certain embodiments, for "non-last" uSIDs 180 that cannot be placed in the last position in uSID carrier 160, a sequence of one or more consecutive "non-last" uSIDs 280 are packed together with next SID 140 (which may or may not have a uSID behavior) in the same uSID carrier 160. If such a packing is not possible because the carrier capacity would be exceeded and/or one or more SIDS 140 in the sequence have a different SID block 170, then the packing operation terminates with an error.

To generate compressed SID list 150, node 120 of system 100 may perform an initialization procedure. The initialization procedure may include one or more of the following steps: (1) initialize packing list 164 of uSID carrier 160 with uSID 180 of SID 140; (2) initialize packing block 162 of uSID carrier 160 with SID block 170 of SID 140; (3) initialize a remaining packing capacity of packing list 164 with a uSID carrier capacity of SID 140; and (4) initialize empty compressed SID list 150. In certain embodiments, SID 140 used in the initialization procedure is the first SID listed in uncompressed SID list 130.

Node 120 of system 100 may perform an iteration procedure to generate compressed SID list 150. In certain embodiments, the iteration procedure follows the initialization procedure. Node 120 of system 100 may apply the iteration procedure to each subsequent SID 140 of uncompressed SID list 130. For example, node 120 may apply the iteration procedure to a second SID 140 listed in uncompressed SID list 130 (where the second SID 140 is subsequent to the first SID 140 used in the initialization procedure), to each subsequent SID 140 (e.g., a third SID, a fourth SID, and so on) listed in uncompressed SID list, and to the last SID 140 listed in uncompressed SID list 130. The iteration process performed by node 120 may include one or more of the following steps:

(1) If SID block 170 of subsequent SID 140 is different from packing block 162 of uSID carrier 160, then: (1.1) generate uSID carrier 160 with uSIDs 180 included in packing list 164; (1.2) append uSID carrier 160 to compressed SID list 150; (1.3) replace uSID 180 of packing list 164 with uSID 180 of subsequent SID 140; (1.4) replace packing block 162 with SID block 170 of subsequent SID 140; and (1.5) replace the remaining packing capacity of packing list 164 with the uSID carrier capacity of subsequent SID 140.

(2) Otherwise, if the uSID carrier usage of subsequent SID 140 is greater than the remaining packing capacity of packing list 164, determine the following: (2.1) if uSID 180 of SID 140 is associated with a local uSID behavior, and last uSID 180 in packing list 164 is associated with a global uSID behavior, and the uSID carrier capacity of that last uSID 180 is greater than or equal to the uSID carrier usage of SID 140, then: (2.1.1) generate uSID carrier 160 with uSIDs 180 included in packing list 164; (2.1.2) append uSID carrier 160 to compressed SID list 150; (2.1.3) remove all but last uSID 180 in packing list 164; (2.1.4) append uSID 180 of subsequent SID 140 to packing list 164; and (2.1.5) set the remaining packing capacity to the uSID carrier capacity of first uSID 180 in packing list 164 minus the uSID carrier usage of subsequent SID 140. (2.2) Otherwise, apply steps 1.1 through 1.5. (3) In all remaining cases (e.g., if SID block 170 of subsequent SID 140 is the same as packing block 162 and the uSID carrier usage of subsequent SID 140 is less than or equal to the remaining packing capacity of packing list 164), append uSID 180 of subsequent SID 140 to packing list 164 and decrement the remaining packing capacity by the carrier usage of subsequent SID 140.

Although FIG. 1 describes and illustrates steps of the initialization procedure and the iteration procedure as occurring in a particular order, this disclosure contemplates any suitable steps of FIG. 1 occurring in any suitable order. Furthermore, although this disclosure describes and illustrates particular components or devices carrying out the steps of the initialization procedure and the iteration procedure of FIG. 1, this disclosure contemplates any suitable combination of any suitable components and devices carrying out the steps of the initialization procedure and the iteration procedure of FIG. 1.

Although FIG. 1 illustrates a particular arrangement of network 110, node 120, uncompressed SID list 130, SIDs 140, compressed SID list 150, uSID carriers 160, packing blocks 162, packing lists 164, uSID carrier positions 166, SID blocks 170, and uSIDs 180, this disclosure contemplates any suitable arrangement of network 110, node 120, uncompressed SID list 130, SIDs 140, compressed SID list 150, uSID carriers 160, packing blocks 162, packing lists 164, uSID carrier positions 166, SID blocks 170, and uSIDs 180.

Although FIG. 1 illustrates a particular number of networks 110, nodes 120, uncompressed SID lists 130, SIDs 140, compressed SID lists 150, uSID carriers 160, packing blocks 162, packing lists 164, uSID carrier positions 166, SID blocks 170, and uSIDs 180, this disclosure contemplates any suitable number of networks 110, nodes 120, uncompressed SID lists 130, SIDs 140, compressed SID lists 150, uSID carriers 160, packing blocks 162, packing lists 164, uSID carrier positions 166, SID blocks 170, and uSIDs 180. For example, system 100 may include more than one node 120, more than one uncompressed SID list 130, and/or more than one compressed SID list 150.

FIG. 2 illustrates an example single-SID compressed SID list 150 that may be used by system 100 of FIG. 1. FIG. 2 includes an uncompressed SID list 130, a single SID 140, a compressed SID list 150, a uSID carrier 160, uSID carrier positions 166, a SID block 170, and uSID 180. SID 140 of uncompressed SID list 130 is represented as fc01:100::. SID 140 includes SID block 170, which is represented as fc01, and uSID 180, which is represented as 100. uSID carrier 160 includes seven uSID carrier positions 166, which include a first uSID carrier position 166a, a second uSID carrier position 166b, a third uSID carrier position 166c, a fourth uSID carrier position 166d, a fifth uSID carrier position 166e, a sixth uSID carrier position 166f, and a seventh uSID carrier position 166g. A network component (e.g., node 120 of FIG. 1) identifies SID 140 of uncompressed SID list 130, which includes SID block 170 and uSID 180, and initializes a packing list of uSID carrier 160 with uSID 180. The network component initializes a packing block of uSID carrier 160 with SID block 170 (fc01) of SID 140. The network component generates empty compressed SID list 150. Since uncompressed SID list 130 only includes one SID 140, the network component generates uSID carrier 160 using SID block 170 of the packing block and uSID 180 of the packing list. As shown in FIG. 2, the network component places uSID 180 (100) in first uSID carrier position 166a of uSID carrier 160. Unused uSID carrier positions 166b, 166c, 166d, 166e, 166f, and 166g of uSID carrier 160 are set to the end-of-carrier value (0). Single-SID compressed SID list 150 of FIGURE is represented by uSID carrier 160.

FIG. 3 illustrates an example full-carrier compressed SID list 150 that may be used by system 100 of FIG. 1. FIG. 3 includes an uncompressed SID list 130, SIDs 140, a compressed SID list 150, a uSID carrier 160, uSID carrier positions 166, a SID block 170, and uSIDs 180. Uncompressed SID list 130 includes multiple SIDs 140. SIDs 140 of uncompressed SID list 130 include a first SID 140a, a second SID 140b, a third SID 140c, a fourth SID 140d, a fifth SID 140e, a sixth SID 140f, and a seventh SID 140g. SID 140a is represented as fc01:100::. SID 140a includes SID block 170a, which is represented as fc01, and uSID 180a, which is represented as 100. SID 140b is represented as fc01:200::. SID 140b includes SID block 170b, which is represented as fc01, and uSID 180b, which is represented as 200. SID 140c is represented as fc01:300::. SID 140c includes SID block 170c, which is represented as fc01, and uSID 180c, which is represented as 300. SID 140d is represented as fc01:400::. SID 140d includes SID block 170d, which is represented as fc01, and uSID 180d, which is represented as 400. SID 140e is represented as fc01:500::. SID 140e includes SID block 170e, which is represented as fc01, and uSID 180e, which is represented as 500. SID 140f is represented as fc01:600::. SID 140f includes SID block 170f, which is represented as fc01, and uSID 180f, which is represented as 600. SID 140g is represented as fc01:700::. SID 140g includes SID block 170g, which is represented as fc01, and uSID 180g, which is represented as 700.

In the illustrated embodiment of FIG. 3, uSID carrier 160 includes seven uSID carrier positions 166, which include a first carrier position 166a, a second carrier position 166b, a third carrier position 166c, a fourth carrier position 166d, a fifth carrier position 166e, a sixth carrier position 166f, and a seventh carrier position 166g. A network component (e.g., node 120 of FIG. 1) identifies SID 140a of uncompressed SID list 130, which includes SID block 170a and uSID 180a, and initializes a packing list of uSID carrier 160 with uSID 180a. The network component initializes a packing block of uSID carrier 160 with SID block 170a (fc01) of SID 140a. The network component generates empty compressed SID list 150.

Since SID blocks 170b through 170g of SIDS 140b through 140g, respectively, are the same as packing block 162 (fc01), the network component appends uSIDs 180b through 180g (200, 300, 400, 500, 600, and 700) of SIDs 140b through 140g, respectively, to packing list 164 of uSID carrier 160. As illustrated in FIG. 3, uSID 180b (200) of SID 140b is placed in uSID carrier position 166b, uSID 180c (300) of SID 140c is placed in uSID carrier position 166c, uSID 180d (400) of SID 140d is placed in uSID carrier position 166d, uSID 180e (500) of SID 140e is placed in uSID carrier position 166e, uSID 180f (600) of SID 140f is placed in uSID carrier position 166f, and uSID 180g (700) of SID 140g is placed in uSID carrier position 166g. As such, all seven uSIDs 180 with the same packing block 162 are packed together in a single uSID carrier 160. Full-carrier compressed SID list 150 of FIG. 3 is represented by uSID carrier 160.

FIG. 4 illustrates an example multiple-carrier compressed SID list 150 that may be used by system 100 of FIG. 1. FIG. 4 includes an uncompressed SID list 130, SIDs 140, compressed SID list 150, uSID carriers 160 (a uSID carrier 160a and a uSID carrier 160b), uSID carrier positions 166, SID blocks 170, and uSIDs 180. Uncompressed SID list 130 includes multiple SIDs 140. SIDs 140 of uncompressed SID list 130 include a first SID 140a, a second SID 140b, and a third SID 140c. SID 140a is represented as fc01:100::. SID 140a includes SID block 170a, which is represented as fc01, and uSID 180a, which is represented as 100. SID 140b is represented as fc02:200::. SID 140b includes SID block 170b, which is represented as fc02, and uSID 180b, which is represented as 200. SID 140c is represented as fc02:300::. SID 140c includes SID block 170c, which is represented as fc02, and uSID 180c, which is represented as 300.

A network component (e.g., node 120 of FIG. 1) initializes a packing list of uSID carrier 160a with uSID 180a (100) of SID 140a. The network component initializes a packing block of uSID carrier 160a with SID block 170a (fc01) of SID 140a. The network component initializes empty compressed SID list 150. The network component then identifies the next subsequent SID (SID 140b) of uncompressed SID list 130.

Since SID block 170b (fc02) of SID 140b is different from the packing block (fc01) of uSID carrier 160a, the network component generates uSID carrier 160a with uSID 180 included in the packing list. uSID carrier 160a includes uSID carrier positions 166, which include a first carrier position 166a, a second carrier position 166b, a third carrier position 166c, a fourth carrier position 166d, a fifth carrier position 166e, a sixth carrier position 166f, and a seventh carrier position 166g. As shown in FIG. 4, the network component places uSID 180a (100) of SID 140a in uSID carrier position 166a. Unused uSID carrier positions 166b, 166c, 166d, 166e, 166f, and 166g of uSID carrier 160 are set to the end-of-carrier value (0). The network component appends uSID carrier 160a to compressed SID list 150. The network component replaces the content (100) of the packing list with uSID 180b (200) of SID 140b. The network component replaces the content (fc01) of the packing block with SID block 170b (fc02) of SID 140b. The network component replaces the remaining packing capacity of the packing list with the uSID carrier capacity of SID 140b. The network component then identifies the next subsequent SID (SID 140c) of uncompressed SID list 130.

Since SID block 170c of SID 140c is the same as the packing block (fc02), the network component appends uSID 180c (300) of SID 140c to the packing list. The network component generates uSID carrier 160b with the content of the packing block and the content of the packing list. uSID carrier 160b includes uSID carrier positions 166h, 166i, 166j, 166k, 166l, 166m, and 166n. As shown in FIG. 4, the network component places uSID 180b (200) of SID 140b in uSID carrier position 166h and places uSID 180c (300) of SID 140c in uSID carrier position 166i. The network component appends uSID carrier 160b to compressed SID list 150. As such, uSID 180b of SID 140b and uSID 180c of SID 140c, which have the same packing block, are packed together in the same uSID carrier 160b. Compressed SID list 150 of FIG. 4 is represented by uSID carriers 160a and 160b.

FIG. 5 illustrates an example multiple-carrier compressed SID list 150 that may be used by system 100 of FIG. 1. FIG. 5 includes an uncompressed SID list 130, SIDs 140, compressed SID list 150, uSID carriers 160 (a uSID carrier 160a and a uSID carrier 160b), uSID carrier positions 166, SID blocks 170, and uSIDs 180. Uncompressed SID list 130 includes nine SIDs 140. SIDs 140 of uncompressed SID list 130 include SID 140a, SID 140b, SID 140c, SID 140d, SID 140e, SID 140f, SID 140g, SID 140h, and SID 140i. SID 140a is represented as fc01:100::. SID 140a includes a SID block 170a, which is represented as fc01, and a uSID 180a, which is represented as 100. SID 140b is represented as fc01:200::. SID 140b includes a SID block 170b, which is represented as fc01, and a uSID 180b, which is represented as 200. SID 140c is represented as fc01:300::. SID 140c includes a SID block 170c, which is represented as fc01, and a uSID 180c, which is represented as 300. SID 140d is represented as fc01:400::. SID 140d includes a SID block 170d, which is represented as fc01, and a uSID 180d, which is represented as 400. SID 140e is represented as fc01:500::. SID 140e includes a SID block 170e, which is represented as fc01, and a uSID 180e, which is represented as 500. SID 140f is represented as fc01:600::. SID 140f includes a SID block 170f, which is represented as fc01, and a uSID 180f, which is represented as 600. SID 140g is represented as fc01:700::. SID 140g includes a SID block 170g, which is represented as fc01, and a uSID 180g, which is represented as 700. SID 140h is represented as fc01:701::. SID 140h includes a SID block 170h, which is represented as fc01, and a uSID 180h, which is represented as 701. SID 140i is represented as fc01:800::. SID 140i includes a SID block 170i, which is represented as fc01, and a uSID 180i, which is represented as 800.

A network component (e.g., node 120 of FIG. 1) identifies SID 140a of uncompressed SID list 130 and initializes a packing list with uSID 180a (100) of SID 140a. The network component initializes a packing block with SID block 170a (fc01) of SID 140a. The network component initializes the remaining packing capacity of the packing list with the uSID carrier capacity of SID 140a. The network component initializes empty compressed SID list 150. The network component then identifies the next subsequent SIDS (SIDS 140b through 140g) of uncompressed SID list 130.

Since SID blocks 170b through 170g of SIDS 140b through 140g, respectively, are the same as the packing block (fc01), the network component appends uSIDs 180b through 180g (200, 300, 400, 500, 600, and 700) of SIDS

140*b* through 140*g* to the packing list. The network component then identifies the next subsequent SID (SID 140*h*) of uncompressed SID list 130.

The network component determines that SID block 170*h* of SID 140*h* is the same as the packing block (fc01) and that the uSID carrier usage of SID 140*h* is greater than the remaining packing capacity of the packing list. The network component determines that SID 140*h* is associated with a local uSID behavior (701), and SID 140*g*, which is the last uSID in the packing list, is associated with a global uSID behavior (700). Since the uSID carrier capacity of SID 140*g* is greater than or equal to the uSID carrier usage of SID 140*h*, the network component generates uSID carrier 160*a* with all but the last SID (SID 140*g*) included in the packing list. uSID carrier 160*a* includes uSID carrier position 166*a*, uSID carrier position 166*b*, uSID carrier position 166*c*, uSID carrier position 166*d*, uSID carrier position 166*e*, uSID carrier position 166*f*, and uSID carrier position 166*g*. The network component places uSID 180*a* (100) of SID 140*a* in uSID carrier position 166*a*, uSID 180*b* (200) of SID 140*b* in uSID carrier position 166*b*, uSID 180*c* (300) of SID 140*c* in uSID carrier position 166*c*, uSID 180*d* (400) of SID 140*d* in uSID carrier position 166*d*, uSID 180*e* (500) of SID 140*e* in uSID carrier position 166*e*, and uSID 180*f* (600) of SID 140*f* in uSID carrier position 166*f* Unused uSID carrier position 166*g* is set to the end-of-carrier value (0). The network component appends uSID carrier 160*a* to compressed SID list 150.

The network component removes all but the last element (uSID 180*g*) in the packing list and appends uSID 180*h* to the packing list. The network component sets the remaining capacity of the packing list to the uSID carrier capacity of SID 140*g* of the packing list minus the uSID carrier usage of uSID 180*h*. The network component then identifies the next subsequent SID (SID 140*i*) of uncompressed SID list 130. Since SID block 170*i* of SID 140*i* is the same as the packing block (fc01), the network component appends uSID 180*i* of SID 140*i* to the packing list. The network component generates uSID carrier 160*b* using the packing list and the packing block. uSID carrier 160*b* includes uSID carrier positions 166*h*, 166*i*, 166*j*, 166*k*, 166*l*, 166*m*, and 166*n*. As illustrated in FIG. 5, the network component places uSID 180*g* (700) of SID 140*g* in uSID carrier position 166*h*, uSID 180*h* (701) of SID 140*h* in uSID carrier position 166*i*, and uSID 180*i* (800) of SID 140*i* in uSID carrier position 166*j*. Unused uSID carrier positions 166*k* through 166*n* are each set to the end-of-carrier value (0). The network component appends uSID carrier 160*b* to compressed SID list 150. As such, uSID 180*g* of SID 140*g* (which is associated with a global uSID behavior) and uSID 180*h* of SID 140*h* (which is associated with a local uSID behavior) are packed together in the same uSID carrier 160*b*. Compressed SID list 150 of FIG. 5 is represented by uSID carriers 160*a* and 160*b*.

FIG. 6 illustrates an example compressed SID list 150 associated with different endpoint behaviors that may be used by system 100 of FIG. 1. FIG. 6 includes an uncompressed SID list 130, SIDS 140, a compressed SID list 150, a uSID carrier 160, uSID carrier positions 166, SID blocks 170, and uSIDs 180. Uncompressed SID list 130 includes SIDS 140. SIDS 140 include SID 140*a* and SID 140*b*. SID 140*a* is represented as fc01:100::. SID 140*a* includes a SID block 170*a*, which is represented as fc01, and a uSID 180*a*, which is represented as 100. SID 140*b* is represented as fc01:0:20:e::. SID 140*b* includes a SID block 170*b*, which is represented as fc01, and a SID 180*b*, which is represented as 0:20:e::. SID 140*b* is not associated with a uSID endpoint behavior.

A network component (e.g., node 120 of FIG. 1) initializes a packing list of uSID carrier 160 with uSID 180*a* of SID 140*a*. The network component initializes a packing block of uSID carrier 160 with SID block 170*a* (fc01) of SID 140*a*. The network component initializes a remaining packing capacity of the packing list with the uSID carrier capacity of SID 140*a*. The network component initializes empty compressed SID list 150. The network component then identifies the next subsequent SID (SID 140*b*) of uncompressed SID list 130.

Since SID block 170*b* of SID 140*b* is the same as the packing block (fc01), the network component appends uSID 180*b* of SID 140*b* to the packing list. The network component generates uSID carrier 160 using the packing block and the packing list. uSID carrier 160 includes uSID carrier positions 166*a*, 166*b*, 166*c*, 166*d*, and 166*e*. As illustrated in FIG. 6, the network component places uSID 180*a* (100) of SID 140*a* in uSID carrier position 166*a* and places uSID 180*b* (0:20:e) of SID 140*b* in uSID carrier position 166*b*. Unused uSID carrier positions 166*c*, 166*d*, and 166*e* of uSID carrier 160 are set to the end-of-carrier value (0). The network component then appends uSID carrier 160 to compressed SID list 150. As such, SID 140*a* and SID 140*b* are packed together in a single uSID carrier 160 even though SID 140*b* is not associated with a uSID endpoint behavior. Compressed SID list 150 of FIG. 6 is represented by uSID carrier 160.

Generally, SRv6 SIDS (e.g., SID 140*b*) that are not associated with uSID endpoint behaviors can be packed in a uSID carrier (e.g., uSID carrier 160) under the condition that they are the last element of the uSID carrier. When such a SID is the last element in a uSID carrier, the IPv6 destination address in the packets received by its parent node is exactly the same as if no compression was used.

Although FIGS. 2 through 6 describe and illustrate the steps for compressing a SID list as occurring in a particular order, this disclosure contemplates any suitable steps of FIGS. 2 through 6 occurring in any suitable order. Furthermore, although this disclosure describes and illustrates particular components or devices carrying out the steps for compressing a SID list of FIGS. 2 through 6, this disclosure contemplates any suitable combination of any suitable components and devices carrying out the steps for compressing a SID list of FIG. 1.

Although FIGS. 2 through 6 illustrate a particular arrangement of uncompressed SID list 130, SIDs 140, compressed SID list 150, uSID carriers 160, uSID carrier positions 166, SID blocks 170, and SIDs/uSIDs 180, this disclosure contemplates any suitable arrangement of uncompressed SID list 130, SIDs 140, compressed SID list 150, uSID carriers 160, uSID carrier positions 166, SID blocks 170, and SIDs/uSIDs 180.

Although FIGS. 2 through 6 illustrate a particular number of uncompressed SID lists 130, SIDs 140, compressed SID lists 150, uSID carriers 160, uSID carrier positions 166, SID blocks 170, and SIDs/uSIDs 180, this disclosure contemplates any suitable number of uncompressed SID list 130, SIDs 140, compressed SID list 150, uSID carriers 160, uSID carrier positions 166, SID blocks 170, and SIDs/uSIDs 180. For example, certain embodiments may include three uSID carriers 160 within a single compressed SID list 150.

FIGS. 7A and 7B illustrate an example method 700 for compressing a SID list. Method 700 begins at step 702. At step 704, a network component initializes a packing list of a first uSID carrier with a first SID of an uncompressed SID list. For example, the network component may compute the SID list, identify the first SID within the SID list, and initialize the packing list of the first uSID carrier by listing a uSID of the first SID as the first element of the packing list. Method 700 then moves from step 704 to step 706, where the network component initializes a packing block of the first uSID carrier with the SID block of the first SID. The network component may initialize the packing block of the first uSID carrier by listing a SID block of the first SID 140 as the first SID block in the packing block. Method 700 then moves from step 706 to step 708, where the network element initializes a remaining packing capacity of the packing list with a carrier capacity of the first SID. At step 710, the network component initializes an empty compressed SID list. Method 700 then moves from step 710 to step 712.

At step 712 of method 700, the network component determines whether the uncompressed SID list includes a subsequent SID. If the uncompressed SID list includes a subsequent SID, method 700 moves from step 712 to step 714, where the network component determines whether the SID block of the subsequent SID is different from the packing block. If the network component determines that the SID block of the subsequent SID is different from the packing block (or if the last SID in the packing block is not associated with a uSID endpoint behavior), method 700 moves from step 714 to step 716, where the network component generates a uSID carrier with the SIDs included in the packing list. Method 700 then moves from step 716 to step 718, where the network component appends the uSID carrier to the compressed SID list. The compressed SID list is represented by the uSID carrier.

Method 700 then moves from step 718 to step 720, where the network component replaces the content of the packing list with the content of the subsequent SID. For example, the network component may replace the uSID of the first SID, as listed in the packing list, with the uSID of the subsequent SID. Method 700 then moves from step 720 to step 722, where the network component replaces the content of the packing block with the SID block of the subsequent SID. For example, the network component may replace the SID block of the first SID with the SID block of the subsequent SID. At step 724, the network component replaces the remaining packing capacity of the packing list with the uSID carrier capacity of the subsequent SID. Method 700 then moves from step 724 back to step 712 and performs step 712 as described above.

If, at step 714, the SID block of the subsequent SID is not different from the packing block, method 700 advances from step 714 to step 726, where the network component determines whether the uSID carrier usage of the subsequent SID is greater than the remaining packing capacity. If the uSID carrier usage of the subsequent SID is not greater than the remaining packing capacity, method 700 advances from step 726 to step 746, where the network component appends the subsequent SID to the packing list. For example, the network component may add the uSID of the subsequent SID to the packing list after the uSID of the first SID. Method 700 then moves from step 746 to step 748, where the network component decrements the remaining packing capacity of the packing list by the carrier usage of the subsequent SID. Method 700 then moves from step 748 back to step 712 and performs step 712 as described above.

If, at step 726, the uSID carrier usage of the subsequent SID is greater than the remaining packing capacity, method 700 moves from step 726 to step 728, where the network component determines whether the subsequent SID is associated with a local uSID behavior. If the network component determines that the subsequent SID is not associated with a local uSID behavior, method 700 advances from step 728 to step 744, where the network component performs steps 716, 718, 720, and 724. Method 700 then moves from step 724 back to step 712 and performs step 712 as described above. If the network component determines that the subsequent SID is associated with a local uSID behavior, method 700 moves from step 728 to step 730.

At step 730 of method 700, the network component determines whether the last uSID in the packing list is associated with a global uSID behavior. If the network component determines that the last uSID in the packing list is not associated with a global uSID behavior, method 700 advances from step 730 to step 744, where the network component performs steps 716, 718, 720, and 724. Method 700 then moves from step 724 back to step 712 and performs step 712 as described above. If the network component determines that the last uSID in the packing list is associated with a global uSID behavior, method 700 moves from step 730 to step 732.

At step 732 of method 700, the network component determines whether the uSID carrier capacity of the last uSID in the packing list is greater than or equal to the uSID carrier usage of the subsequent SID. If the network component determines that the uSID carrier capacity of the last uSID in the packing list is not greater than or equal to the uSID carrier usage of the subsequent SID, method 700 advances from step 730 to step to step 744, where the network component performs steps 716, 718, 720, and 724. Method 700 then moves from step 724 back to step 712 and performs step 712 as described above. If, at step 732, the network component determines that the uSID carrier capacity of the last uSID is greater than or equal to the uSID carrier usage of the subsequent SID, method 700 moves from step 732 to step 734, where the network component generates a uSID carrier with all but the last SID included in the packing list of the uSID carrier. Method 700 then moves from step 734 to step 736, where the network component appends the uSID carrier to the compressed SID list. Method 700 them moves from step 736 to step 738.

At step 738 of method 700, the network component removes all but the last uSID in the packing list. Method 700 them moves from step 738 to step 740, where the network component appends the subsequent SID to the packing list. For example, the network component may list the uSID of the subsequent SID in the packing list after the first uSID. At step 742 of method 700, the network component sets the remaining packing capacity to the uSID carrier capacity of the first SID in the packing list minus the uSID carrier usage of the subsequent SID. Method 700 then moves from step 742 back to step 712 and performs step 712 as described above.

If, at step 712 of method 700, the network component determines that the uncompressed SID list does not include a subsequent SID, method 700 advances from step 712 to step 750, where the network component generates a uSID carrier using the packing block and the packing list. At step 752, the network component appends the uSID carrier to the compressed SID list. Method 700 then moves from step 752 to step 754, where method 700 ends.

Although this disclosure describes and illustrates particular steps of the method of FIGS. 7A and 7B as occurring in a particular order, this disclosure contemplates any suitable steps of the method of FIGS. 7A and 7B occurring in any suitable order. Moreover, although this disclosure describes and illustrates an example method for compressing a SID list including the particular steps of the method of FIGS. 7A and 7B, this disclosure contemplates any suitable method for compressing a SID list including any suitable steps, which may include all, some, or none of the steps of the method of FIGS. 7A and 7B, where appropriate. Furthermore, although this disclosure describes and illustrates particular components, devices, or systems carrying out particular steps of the method of FIGS. 7A and 7B, this disclosure contemplates any suitable combination of any suitable components, devices, or systems carrying out any suitable steps of the method of FIGS. 7A and 7B.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A network component, comprising:
one or more processors; and
one or more computer-readable non-transitory storage media coupled to the one or more processors and comprising instructions that, when executed by the one or more processors, cause the network component to perform operations comprising:
identifying a first segment identifier (SID) within a SID list, wherein the first SID comprises a first SID block and a first micro SID (uSID);
initializing a packing list of a uSID carrier with the first uSID of the first SID;
initializing a packing block of the uSID carrier with the first SID block of the first SID;
initializing a remaining packing capacity of the packing list with a carrier capacity of the first SID;
generating a compressed SID list, wherein the compressed SID list comprises one or more uSID carrier positions set to an end-of-carrier value zero; and
encoding the compressed SID list in a network packet.

2. The network component of claim 1, the operations further comprising:
identifying a second SID within the SID list, wherein the second SID comprises a second SID block and a second uSID;
determining that the second SID block is the same as the packing block of the uSID carrier;
appending the second uSID of the second SID to the packing list of the uSID carrier; and
decrementing the remaining packing capacity of the uSID carrier by a carrier usage of the second SID.

3. The network component of claim 1, the operations further comprising:
identifying a second SID within the SID list, wherein the second SID comprises a second SID block and a second uSID;
determining that the second SID block is different from the packing block of the uSID carrier;
generating the uSID carrier using the packing block and the packing list;
appending the uSID carrier to the compressed SID list;
replacing the first uSID of the packing list with the second uSID;
replacing the first SID block of the packing block with the second SID block; and
setting a remaining packing capacity of the packing list with a carrier capacity of the second SID.

4. The network component of claim 1, the operations further comprising:
identifying a second SID within the SID list, wherein the second SID comprises a second SID block and a second uSID;
determining that the second SID block is the same as the packing block of the uSID carrier;
determining that a uSID carrier usage of the second SID is greater than the remaining packing capacity of the packing list;
generating the uSID carrier using the packing block and the packing list;
appending the uSID carrier to the compressed SID list;
replacing the first uSID of the packing list with the second uSID; and
replacing the remaining packing capacity of the packing block with a carrier capacity of the second SID.

5. The network component of claim 1, the operations further comprising:
identifying a second SID within the SID list, wherein the second SID is instantiated on a particular parent node;
identifying a third SID within the SID list, wherein:
the third SID is subsequent to the second SID within the SID list, and
the third SID is instantiated on the particular parent node; and
packing the second SID and the third SID within a second uSID carrier.

6. The network component of claim 1, wherein encoding the compressed SID list in the network packet comprises using an Internet Protocol version 6 (IPv6) header, wherein the compressed SID list is included within a single 128-bit Segment Routing over IPv6 (SRv6) SID.

7. The network component of claim 1, wherein:
the remaining packing capacity depends on a SID structure and packet editing capabilities of the network component; and
a topological and service path of the network packet steered onto the compressed SID list is the same as the topological and service path of the network packet steered onto the SID list.

8. A method, comprising:
identifying, by a network component, a first segment identifier (SID) within a SID list,
wherein the first SID comprises a first SID block and a first micro SID (uSID);
initializing, by the network component, a packing list of a uSID carrier with the first uSID of the first SID;
initializing, by the network component, a packing block of the uSID carrier with the first SID block of the first SID;
initializing, by the network component, a remaining packing capacity of the packing list with a carrier capacity of the first SID;
generating, by the network component, a compressed SID list, wherein the compressed SID list comprises one or more uSID carrier positions set to an end-of-carrier value zero; and
encoding the compressed SID list in a network packet.

9. The method of claim 8, further comprising:
identifying, by the network component, a second SID within the SID list, wherein the second SID comprises a second SID block and a second uSID;
determining, by the network component, that the second SID block is the same as the packing block of the uSID carrier;
appending, by the network component, the second uSID of the second SID to the packing list of the uSID carrier; and
decrementing, by the network component, the remaining packing capacity of the uSID carrier by a carrier usage of the second SID.

10. The method of claim 8, further comprising:
identifying, by the network component, a second SID within the SID list, wherein the second SID comprises a second SID block and a second uSID;

determining, by the network component, that the second SID block is different from the packing block of the uSID carrier;
generating, by the network component, the uSID carrier using the packing block and the packing list;
appending, by the network component, the uSID carrier to the compressed SID list;
replacing, by the network component, the first uSID of the packing list with the second uSID;
replacing, by the network component, the first SID block of the packing block with the second SID block; and
setting, by the network component, a remaining packing capacity of the packing list with a carrier capacity of the second SID.

11. The method of claim 8, further comprising:
identifying, by the network component, a second SID within the SID list, wherein the second SID comprises a second SID block and a second uSID;
determining, by the network component, that the second SID block is the same as the packing block of the uSID carrier;
determining, by the network component, that a uSID carrier usage of the second SID is greater than the remaining packing capacity of the packing list;
generating, by the network component, the uSID carrier using the packing block and the packing list;
appending, by the network component, the uSID carrier to the compressed SID list;
replacing, by the network component, the first uSID of the packing list with the second uSID; and
replacing, by the network component, the remaining packing capacity of the packing block with a carrier capacity of the second SID.

12. The method of claim 8, further comprising:
identifying, by the network component, a second SID within the SID list, wherein the second SID is instantiated on a particular parent node;
identifying, by the network component, a third SID within the SID list, wherein:
the third SID is subsequent to the second SID within the SID list, and
the third SID is instantiated on the particular parent node; and
packing, by the network component, the second SID and the third SID within a second uSID carrier.

13. The method of claim 8, wherein encoding the compressed SID list in the network packet comprises using an Internet Protocol version 6 (IPv6) header, wherein the compressed SID list is included within a single 128-bit Segment Routing over IPv6 (SRv6) SID.

14. The method of claim 8, wherein:
the remaining packing capacity depends on a SID structure and packet editing capabilities of the network component; and
a topological and service path of a network packet steered onto the compressed SID list is the same as the topological and service path of the network packet steered onto the SID list.

15. One or more computer-readable non-transitory storage media embodying instructions that, when executed by a processor, cause the processor to perform operations comprising:
identifying a first segment identifier (SID) within a SID list, wherein the first SID comprises a first SID block and a first micro SID (uSID);
initializing a packing list of a uSID carrier with the first uSID of the first SID;
initializing a packing block of the uSID carrier with the first SID block of the first SID;
initializing a remaining packing capacity of the packing list with a carrier capacity of the first SID;
generating a compressed SID list, wherein the compressed SID list comprises one or more uSID carrier positions set to an end-of-carrier value zero; and
encoding the compressed SID list in a network packet.

16. The one or more computer-readable non-transitory storage media of claim 15, the operations further comprising:
identifying a second SID within the SID list, wherein the second SID comprises a second SID block and a second uSID;
determining that the second SID block is the same as the packing block of the uSID carrier;
appending the second uSID of the second SID to the packing list of the uSID carrier; and
decrementing the remaining packing capacity of the uSID carrier by a carrier usage of the second SID.

17. The one or more computer-readable non-transitory storage media of claim 15, the operations further comprising:
identifying a second SID within the SID list, wherein the second SID comprises a second SID block and a second uSID;
determining that the second SID block is different from the packing block of the uSID carrier;
generating the uSID carrier using the packing block and the packing list;
appending the uSID carrier to the compressed SID list;
replacing the first uSID of the packing list with the second uSID;
replacing the first SID block of the packing block with the second SID block; and
setting a remaining packing capacity of the packing list with a carrier capacity of the second SID.

18. The one or more computer-readable non-transitory storage media of claim 15, the operations further comprising:
identifying a second SID within the SID list, wherein the second SID comprises a second SID block and a second uSID;
determining that the second SID block is the same as the packing block of the uSID carrier;
determining that a uSID carrier usage of the second SID is greater than the remaining packing capacity of the packing list;
generating the uSID carrier using the packing block and the packing list;
appending the uSID carrier to the compressed SID list;
replacing the first uSID of the packing list with the second uSID; and
replacing the remaining packing capacity of the packing block with a carrier capacity of the second SID.

19. The one or more computer-readable non-transitory storage media of claim 15, the operations further comprising:
identifying a second SID within the SID list, wherein the second SID is instantiated on a particular parent node;
identifying a third SID within the SID list, wherein:
the third SID is subsequent to the second SID within the SID list, and
the third SID is instantiated on the particular parent node; and
packing the second SID and the third SID within a second uSID carrier.

20. The one or more computer-readable non-transitory storage media of claim 15, wherein encoding the compressed SID list in the network packet comprises using an Internet Protocol version 6 (IPv6) header, wherein the compressed SID list is included within a single 128-bit Segment Routing over IPv6 (SRv6) SID.

* * * * *